(12) United States Patent
Oki (10) Patent No.: US 9,512,811 B2
(45) Date of Patent: Dec. 6, 2016

(54) FUEL SUPPLY PUMP

(71) Applicant: DENSO CORPORATION, Kariya, Aichi-pref. (JP)

(72) Inventor: Naoto Oki, Nagoya (JP)

(73) Assignee: DENSO CORPORATION, Kariya (JP)

( * ) Notice: Subject to any disclaimer, the term of this patent is extended or adjusted under 35 U.S.C. 154(b) by 946 days.

(21) Appl. No.: 13/755,789

(22) Filed: Jan. 31, 2013

(65) Prior Publication Data

US 2013/0192563 A1  Aug. 1, 2013

(30) Foreign Application Priority Data

Jan. 31, 2012 (JP) .................................. 2012-18214

(51) Int. Cl.
*F02M 69/02* (2006.01)
*F02M 63/00* (2006.01)
(Continued)

(52) U.S. Cl.
CPC ............. *F02M 69/02* (2013.01); *F02M 53/00* (2013.01); *F02M 59/102* (2013.01);
(Continued)

(58) Field of Classification Search
CPC .. F02M 53/00; F02M 59/102; F02M 63/0001; F02M 63/0265; F02M 69/02; F02M 53/04; F02M 53/043; F02M 2700/434; F02M 2700/4359; F02M 59/34; F02M 59/44; F04B 1/0413; F04B 23/103; F04B 53/08; F04B 1/184; F04B 1/2071; F04B 27/083; F04B 27/109; F04B 35/002; F04B 39/0238; F04B 39/06; F04B 39/064; F04B 53/00; F04B 53/18; F04B 2203/041; F04B 2203/0606; F04B 39/0215; F04D 29/5806; F04D 29/584; F04D 29/588;F02D 41/3845; F02D 2200/0602; F02D 1/00; F04C 15/0088; F16C 33/10; F16C 33/667; F16C 3/14; F16C 3/16; F16C 41/00; F01M 2011/026; F01M 5/001; F02B 2275/14; F02B 3/06; F16N 39/02; H02K 9/19; Y02T 10/123; Y02T 50/675; Y10S 384/90
(Continued)

(56) References Cited

U.S. PATENT DOCUMENTS 3,714,935 A * 2/1973 Dreisin ..................... F02D 1/00
123/364
3,961,861 A * 6/1976 Mowbray .......... F02M 41/1405
417/253
(Continued)

FOREIGN PATENT DOCUMENTS

JP  2000-130289    5/2000
JP  2003-172230    6/2003
(Continued)

OTHER PUBLICATIONS

Office Action (7 pages) dated Sep. 9, 2014 issued in corresponding Chinese Application No. 201310038411.5 and English translation (11 pages).

*Primary Examiner* — Hung Q Nguyen
*Assistant Examiner* — John Bailey
(74) *Attorney, Agent, or Firm* — Nixon & Vanderhye P.C.

(57) ABSTRACT

A fuel supply pump includes a low-pressure pump and a high-pressure pump. The low-pressure pump pumps up fuel from a fuel tank. The high-pressure pump includes a pressurizing chamber to which fuel pumped up by the low-pressure pump is supplied, and pressurizes fuel in the pressurizing chamber. The high-pressure pump further includes a cam shaft, a cam, a plunger, a housing, and a bush. The cam is provided eccentrically to a central axis of the cam shaft and is rotated integrally with the cam shaft. The (Continued)

plunger is driven by the cam to pressurize fuel in the pressurizing chamber. The housing accommodates the cam shaft. The bush is fixed to the housing to bearing-support the cam shaft. The housing includes a cooling passage, through which fuel discharged from the low-pressure pump flows on an outer peripheral side of the bush to serve as a medium for cooling the bush.

11 Claims, 8 Drawing Sheets

(51) Int. Cl.
    *F02M 63/02*     (2006.01)
    *F02M 53/00*     (2006.01)
    *F02M 59/10*     (2006.01)
    *F04B 53/08*     (2006.01)
    *F04B 1/04*     (2006.01)
    *F04B 23/10*     (2006.01)
    *F16C 37/00*     (2006.01)
    *F16C 17/02*     (2006.01)

(52) U.S. Cl.
    CPC .... *F02M 63/0001* (2013.01); *F02M 63/0265* (2013.01); *F04B 1/0413* (2013.01); *F04B 23/103* (2013.01); *F04B 53/08* (2013.01); *F16C 17/02* (2013.01); *F16C 37/00* (2013.01)

(58) Field of Classification Search
    USPC .............. 123/446, 445, 447, 448, 449, 450, 451,123/452, 455, 456, 464, 495, 497, 500, 501,123/502, 503, 504, 514, 541, 557, 41.2, 41.47,123/41.79, 366, 689, 540, 550, 196 AB, 198 C; 16/36; 184/32, 104.1–104.3; 417/423.12, 417/423.13, 273, 366; 415/180; 277/591, 597, 277/930, 585
    See application file for complete search history.

(56) References Cited

U.S. PATENT DOCUMENTS

| | | | | |
|---|---|---|---|---|
| 4,289,460 A * | 9/1981 | Noell | F04C 15/0088 | 418/102 |
| 4,580,951 A * | 4/1986 | Carleton | F02M 37/08 | 184/30 |
| 5,129,482 A * | 7/1992 | Warner | F16N 39/02 | 184/104.3 |
| 5,154,573 A * | 10/1992 | Buse | F04D 29/0462 | 415/110 |
| 5,354,183 A * | 10/1994 | Eisenbacher | F04B 53/08 | 417/273 |
| 6,012,909 A * | 1/2000 | Sloteman | F04D 13/0666 | 415/58.2 |
| 6,241,484 B1 * | 6/2001 | Hiltemann | F04B 1/0404 | 417/273 |
| 6,390,072 B1 * | 5/2002 | Breeden | F02M 59/105 | 123/495 |
| 6,485,182 B2 * | 11/2002 | Nicholas | F16C 17/03 | 384/117 |
| 6,615,799 B2 * | 9/2003 | Mori | F02M 59/06 | 123/450 |
| 6,722,864 B2 * | 4/2004 | Suzuki | F02M 59/102 | 123/456 |
| 6,725,843 B2 * | 4/2004 | Utsumi | F02M 37/06 | 123/495 |
| 6,895,936 B2 * | 5/2005 | Kuroda | F02M 63/025 | 123/446 |
| 7,107,967 B2 * | 9/2006 | Sano | F02M 59/102 | 123/450 |
| 7,207,319 B2 * | 4/2007 | Utsumi | F02D 41/22 | 123/446 |
| 7,314,351 B2 * | 1/2008 | Kuroda | F02M 59/102 | 417/251 |
| 7,377,753 B2 * | 5/2008 | Kuroda | F02M 53/00 | 417/251 |
| 7,793,642 B2 * | 9/2010 | Yonemoto | F02M 37/0035 | 123/506 |
| 8,122,811 B2 * | 2/2012 | Takamizawa | F02M 59/06 | 92/153 |
| 8,136,507 B2 * | 3/2012 | Nagai | F02M 37/0023 | 123/468 |
| 8,192,151 B2 * | 6/2012 | Ballard | F01D 25/12 | 415/107 |
| 8,328,509 B2 * | 12/2012 | Gee | F01D 25/183 | 415/180 |
| 8,550,041 B2 * | 10/2013 | Lemke | F01B 7/14 | 123/41.81 |
| 9,046,125 B2 * | 6/2015 | Sanda | F01M 5/02 | |
| 2003/0044288 A1 * | 3/2003 | Utsumi | F02M 55/00 | 417/199.1 |
| 2003/0089339 A1 * | 5/2003 | Schueler | F02M 59/06 | 123/446 |
| 2003/0101970 A1 * | 6/2003 | Utsumi | F02M 37/06 | 123/495 |
| 2003/0108443 A1 * | 6/2003 | Suzuki | F02M 59/102 | 417/470 |
| 2004/0007214 A1 * | 1/2004 | Schmidl | F04B 49/225 | 123/514 |
| 2004/0179950 A1 * | 9/2004 | Kuroda | F02M 59/102 | 417/244 |
| 2004/0197216 A1 * | 10/2004 | Kuroda | F02M 53/00 | 417/470 |
| 2004/0208753 A1 * | 10/2004 | Mori | F02M 39/005 | 417/244 |
| 2005/0047929 A1 * | 3/2005 | Hanyu | F02M 37/043 | 417/273 |
| 2005/0076888 A1 * | 4/2005 | Hanyu | F04B 1/0413 | 123/495 |
| 2005/0129532 A1 * | 6/2005 | Sano | F02M 59/102 | 417/273 |
| 2005/0199219 A1 * | 9/2005 | Utsumi | F02D 41/22 | 123/458 |
| 2005/0265867 A1 * | 12/2005 | Djordjevic | F04B 1/053 | 417/429 |
| 2006/0169251 A1 * | 8/2006 | Mori | F02M 37/22 | 123/446 |
| 2007/0036664 A1 * | 2/2007 | Shibui | F01D 25/125 | 417/407 |
| 2008/0156295 A1 * | 7/2008 | Suzuki | F02M 37/0041 | 123/447 |
| 2008/0178845 A1 * | 7/2008 | Shimai | F02M 37/0052 | 123/446 |
| 2008/0273990 A1 * | 11/2008 | Pham | F04D 17/122 | 417/53 |
| 2009/0180900 A1 * | 7/2009 | Djordjevic | F02M 59/102 | 417/273 |
| 2010/0247342 A1 * | 9/2010 | Shimizu | F01D 15/10 | 417/410.1 |
| 2011/0048384 A1 * | 3/2011 | O'Shea | F01C 21/02 | 123/495 |
| 2012/0014782 A1 * | 1/2012 | Petitjean | F01D 25/14 | 415/170.1 |

FOREIGN PATENT DOCUMENTS

| | | |
|---|---|---|
| JP | 2003-172231 | 6/2003 |
| JP | 2004-270647 | 9/2004 |

* cited by examiner

DIFFICULT TO RELEASE HEAT

RELEASE HEAT

FUEL SUPPLY PUMP

CROSS REFERENCE TO RELATED APPLICATION

This application is based on Japanese Patent Application No 2012-18214 filed on Jan. 31, 2012, the disclosure of which is incorporated herein by reference.

TECHNICAL FIELD

The present disclosure relates to a fuel supply pump for an internal combustion engine.

BACKGROUND

For a conventional fuel supply pump, there is a pump including a low-pressure pump that pumps up fuel from a fuel tank; and a high-pressure pump that includes a pressurizing chamber, to which the fuel from this low-pressure pump is supplied, and that pressurizes the fuel in the pressurizing chamber. The high-pressure pump includes a cam shaft rotated by an internal combustion engine; and a cam that is provided eccentrically to the central axis of the cam shaft and that is rotated integrally with the cam shaft. The fuel in the pressurizing chamber is pressurized by a plunger which is driven by the cam.

Figure 11:
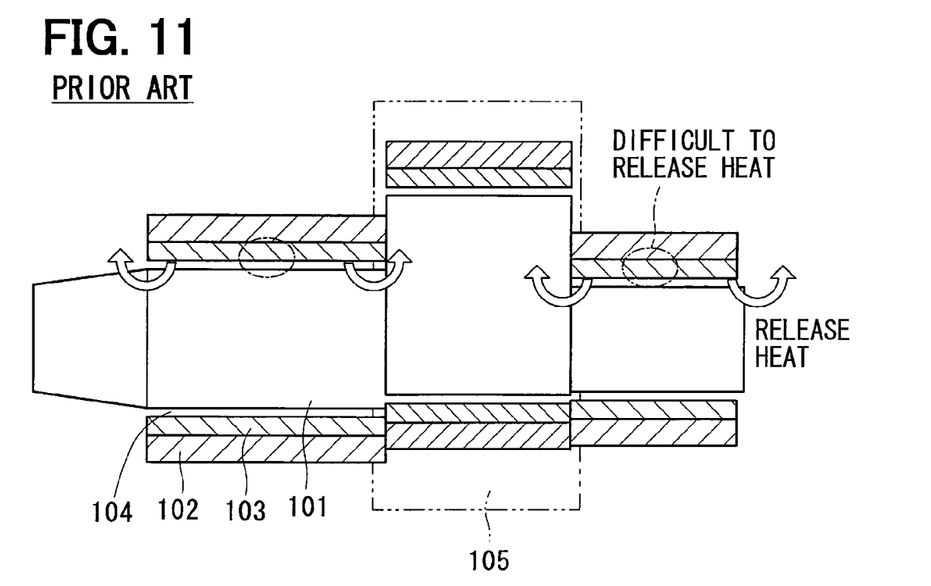
FIG. 11 is a diagram illustrating a bearing structure of a previously proposed cam shaft.

As illustrated in FIG. 11, a cam shaft 101 is bearing-supported by a bush 103 which is fixed to a housing 102. Accordingly, if a heat release between the cam shaft 101 and the bush 103 is insufficient, a sliding surface between the cam shaft 101 and the bush 103 may be seared. Particularly, as illustrated in FIG. 11, heat is not easily released from a central part of the bush 103 in its axial direction.

Accordingly, in JP-A-2004-270647 corresponding to U.S. 2004/0179950A1, there is disclosed a technology for cooling the bush 103 by forcibly flowing a part of fuel discharged from a low-pressure pump using feed pressure into a clearance 104 between the cam shaft 101 and the bush 103.

However, according to the technology described in JP-A-2004-270647, the fuel passing through the clearance 104 flows into a cam chamber 105 to be returned to a fuel tank. Thus, a part of fuel that is supposed to be discharged from the low-pressure pump and to be supplied into a pressurizing chamber is lost. As a result, the amount of fuel discharged from the low-pressure pump is reduced, and startability of the fuel supply pump may thereby deteriorate.

SUMMARY

The present disclosure addresses at least one of the above issues.

According to the present disclosure, there is provided a fuel supply pump including a low-pressure pump and a high-pressure pump. The low-pressure pump is configured to pump up fuel from a fuel tank. The high-pressure pump includes a pressurizing chamber to which fuel pumped up by the low-pressure pump is supplied, and is configured to pressurize fuel in the pressurizing chamber. The high-pressure pump further includes a cam shaft, a cam, a plunger, a housing, and a bush. The cam is provided eccentrically to a central axis of the cam shaft and is rotated integrally with the cam shaft. The plunger is driven by the cam to pressurize fuel in the pressurizing chamber. The housing accommodates the cam shaft. The bush is fixed to the housing to bearing-support the cam shaft. The housing includes a cooling passage, through which fuel discharged from the low-pressure pump flows on an outer peripheral side of the bush to serve as a medium for cooling the bush.

Accordingly, by passing the fuel discharged from the low-pressure pump on the outer peripheral side of the bush instead of through a clearance between the bush and the cam shaft, the bush is cooled. As a result, the fuel discharged from the low-pressure pump does not leak through the clearance between the bush and the cam shaft. Thus, the bush can be cooled without affecting the amount of fuel discharged from the low-pressure pump.

The fuel supply pump may further include a cam chamber that accommodates the cam; and a first passage through which fuel is supplied from the low-pressure pump into the cam chamber for lubrication of the cam. A part of the first passage may be the cooling passage. More specifically, the bush is cooled by disposing the part of first passage to pass on the outer peripheral side of the bush.

Accordingly, the first passage, which is the existing passage, also serves as the cooling passage, and the bush can be cooled without affecting the amount of fuel discharged from the low-pressure pump.

According to the present disclosure, there is also provided a fuel supply pump for an internal combustion engine, including a low-pressure pump, a fuel suction passage, and a high-pressure pump. The low-pressure pump is configured to pump up fuel from a fuel tank. The fuel suction passage connects together the fuel tank and an upstream side of the low-pressure pump. The high-pressure pump includes a pressurizing chamber to which fuel pumped up by the low-pressure pump is supplied, and is configured to pressurize fuel in the pressurizing chamber. The high-pressure pump further includes a cam shaft, a cam, a plunger, a housing, and a bush. The cam shaft is rotated by the engine. The cam is provided eccentrically to a central axis of the cam shaft and is rotated integrally with the cam shaft. The plunger is driven by the cam to pressurize fuel in the pressurizing chamber. The housing accommodates the cam shaft. The bush is fixed to the housing to bearing-support the cam shaft. A part of the fuel suction passage also serves as a cooling passage.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments will be explained in detail in the following description.

First Embodiment

A configuration of a fuel supply pump 1 in accordance with a first embodiment will be described in reference to FIGS. 1 to 4C. The fuel supply pump 1 is used for, for example, an accumulator fuel injection system for a diesel engine and pressurizes fuel to supply the fuel to a common rail (not shown). The fuel pressure-accumulated in the common-rail is injected into a combustion chamber of the engine through an injector.

The entire configuration of the fuel supply pump 1 will be described with reference to FIGS. 1 and 2. The fuel supply pump 1 includes a low-pressure pump 3 that pumps up fuel from a fuel tank 2, a high-pressure pump 4 that pressurizes the fuel pumped up by the low-pressure pump 3 and that pressure-feeds the fuel, and a housing 5.

The low-pressure pump 3 is constituted of, for example, a well-known trochoid pump, and pressurizes the fuel pumped up from the fuel tank 2 to a predetermined pressure, to discharge the fuel.

The high-pressure pump 4 includes a cam shaft 8 rotated by the internal combustion engine, a cam 9 that is provided eccentrically to the central axis of the cam shaft 8 to convert rotational movement of the cam shaft 8 into reciprocating movement, and a plunger 10 to which this reciprocating movement is transmitted.

The housing 5 includes a housing main body 12 which accommodates the cam shaft 8 and the low-pressure pump 3, and a cylinder body 13 which accommodates the plunger 10 so that the plunger 10 is capable of reciprocating in the body 13.

The housing main body 12 includes a shaft insertion hole 12a, through which the cam shaft 8 is inserted, and a cam chamber 12b, which accommodates the cam 9. The cam shaft 8 is bearing-supported by a bush 14 fixed to the shaft insertion hole 12a. The bush 14 of the present embodiment is formed from a copper material. The cam shaft 8 is inserted into the bush 14, and the cam shaft 8 is thereby rotatably bearing-supported.

Figure 1:
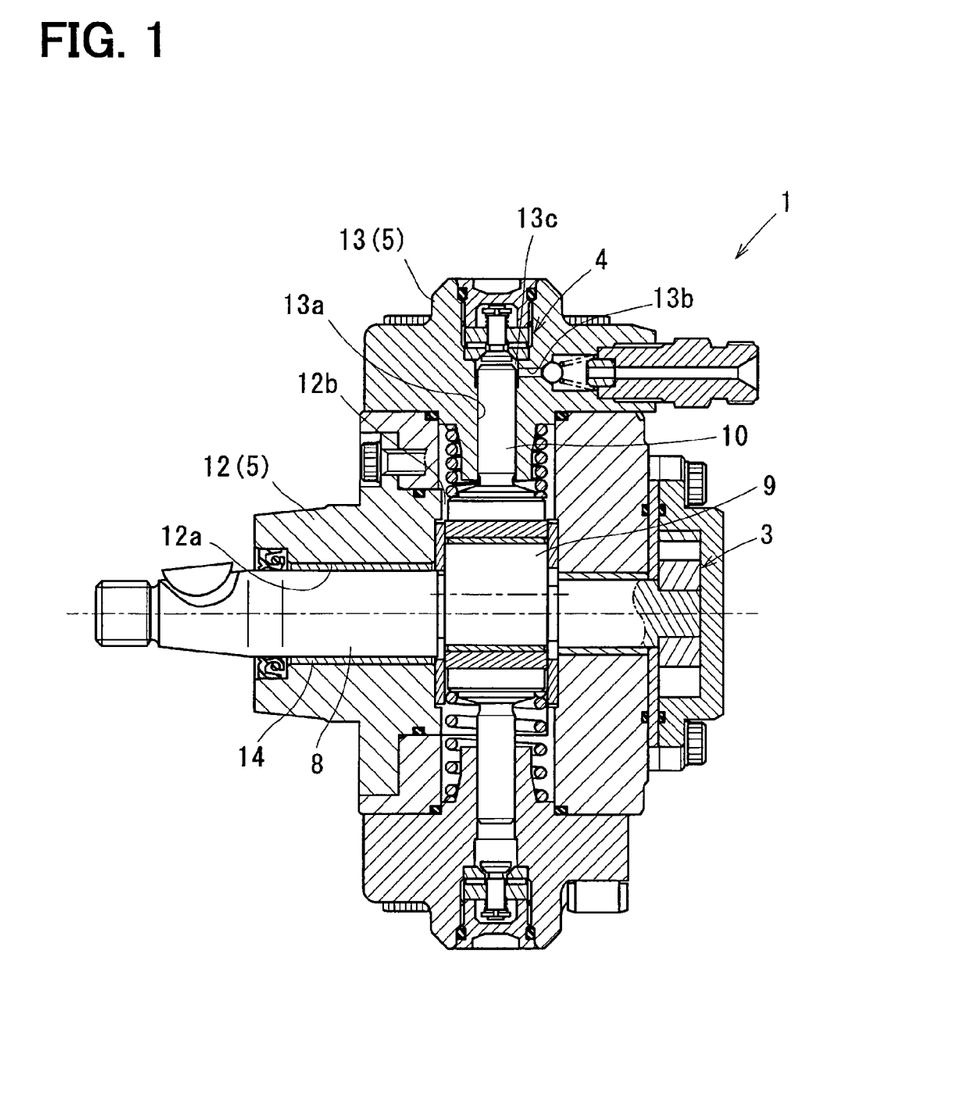
FIG. 1 is a sectional view illustrating a fuel supply pump in accordance with a first embodiment.

The cylinder body 13 includes a cylinder hole 13a that is formed in upper and lower directions in FIG. 1, and a fuel discharge hole 13b that communicates with the cylinder hole 13a. The plunger 10 is accommodated in the cylinder hole 13a. A pressurizing chamber 13c, into which fuel is supplied and the fuel in which is compressed by the reciprocation of the plunger 10, is formed at one end part of the cylinder hole 13a.

The fuel discharged from the low-pressure pump 3 is regulated through a metering valve 15 to be supplied into the pressurizing chamber 13c. The fuel is pressurized by the plunger 10 in the pressurizing chamber 13c to be pressure-fed into the common-rail through the fuel discharge hole 13b. In addition, a pressure regulating valve 16 that regulates pressure of fuel on an upstream side of the metering valve 15 is disposed on a downstream side of the low-pressure pump 3.

Figure 2:
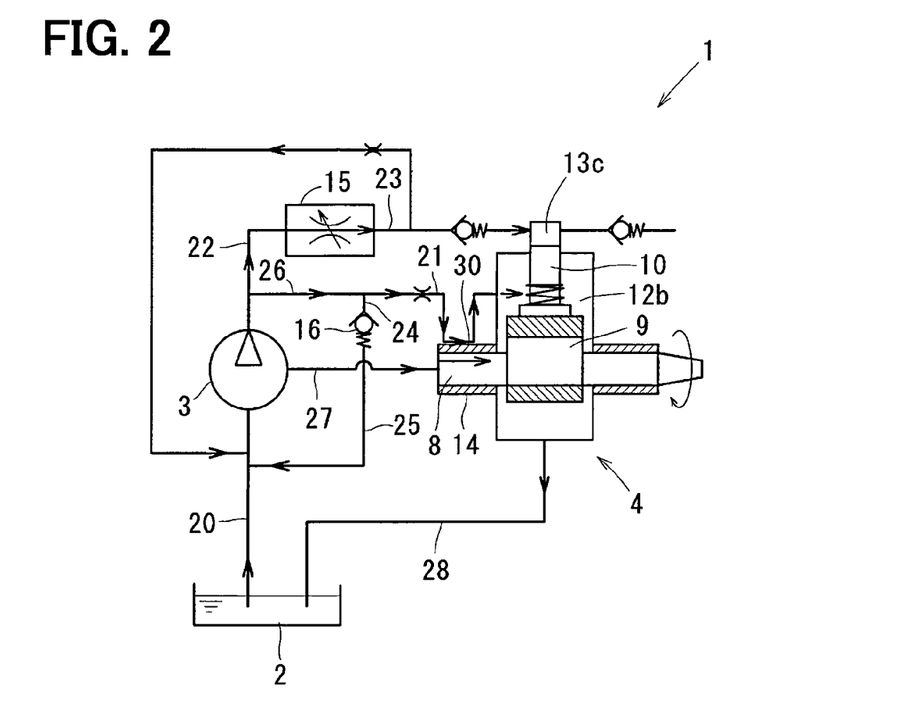
FIG. 2 is a diagram illustrating the fuel supply pump of the first embodiment.

As illustrated in FIG. 2, there are, for example, a passage serving as a route through which fuel is pressure-fed from the fuel tank 2 into the common-rail, and a passage serving as a route through which low-pressure fuel is returned to the fuel tank 2.

More specifically, the fuel supply pump 1 includes a fuel suction passage 20 that connects together the fuel tank 2 and an upstream side of the low-pressure pump 3, a first passage 21 that connects together the cam chamber 12b and the downstream side of the low-pressure pump 3, a second passage 22 that connects together the downstream side of the low-pressure pump 3 and an upstream side of the metering valve 15, a third passage 23 that connects together a downstream side of the metering valve 15 and an upstream side of the pressurizing chamber 13c, a fourth passage 24 that connects together an upstream side of the pressure regulating valve 16 and the downstream side of the low-pressure pump 3, and a fifth passage 25 that connects together a downstream side of the pressure regulating valve 16 and the upstream side of the low-pressure pump 3.

The first passage 21 and the fourth passage 24 branch from a sixth passage 26, which branches from a halfway portion of the second passage 22.

The fifth passage 25 is connected to the fuel suction passage 20 on the upstream side of the low-pressure pump 3. The fuel supply pump 1 includes a seventh passage 27 through which the low-pressure leaking fuel from the low-pressure pump 3 is supplied into a clearance between the cam shaft 8 and the bush 14, and an eighth passage 28 through which the low-pressure leaking fuel from the cam chamber 12b is returned to the fuel tank 2.

The first passage 21 is a passage for supply of surplus fuel from the low-pressure pump 3 into the cam chamber 12b for lubrication of the cam 9. The second passage 22 is a passage for supplying fuel to the metering valve 15 from the low-pressure pump 3. The third passage 23 is a passage for supplying fuel to the pressurizing chamber 13c from the metering valve 15.

The fourth passage 24 is a passage for returning the fuel to the upstream side of the low-pressure pump 3 at the time of opening of the pressure regulating valve 16, and is a passage located on the upstream side of the pressure regulating valve 16. The fifth passage 25 is the passage for returning the fuel to the upstream side of the low-pressure pump 3 at the time of opening of the pressure regulating valve 16 and is a passage located on the downstream side of the pressure regulating valve 16.

The operation of the fuel supply pump 1 will be described in full detail below in reference to FIG. 2. Upon drive of the low-pressure pump 3, fuel is introduced from the fuel tank 2 to the fuel suction passage 20 to be suctioned into a suction side of the low-pressure pump 3. The low-pressure pump 3 pressurizes the suctioned fuel to a predetermined pressure to deliver the fuel to the metering valve 15 through the second passage 22. The fuel whose amount has been adjusted by the metering valve 15 is supplied into the pressurizing chamber 13*c* through the third passage 23. The fuel supplied into the pressurizing chamber 13*c* is pressurized by a feed stroke of the plunger 10.

A surplus of the fuel discharged from the low-pressure pump 3 is supplied into the cam chamber 12*b* through the first passage 21. The fuel which has overflowed from the cam chamber 12*b* is returned into the fuel tank 2 through the eighth passage 28. The fuel supplied to the cam chamber 12*b* is used for lubrication of a sliding part of the cam 9. When the fuel pressure in the second passage 22 is higher than a predetermined value, the pressure regulating valve 16 is opened, and fuel is returned to the fuel suction passage 20 through the fifth passage 25.

Characteristics of the first embodiment will be described below. The fuel supply pump 1 includes a cooling passage 30 that flows the fuel discharged from the low-pressure pump 3 on an outer peripheral side of the bush 14, the fuel serving as a medium for cooling the bush 14. In the present embodiment, a part of first passage 21 is the cooling passage 30. More specifically, the bush 14 is cooled by disposing the part of first passage 21 to pass on the outer peripheral side of the bush 14.

Figure 3A:
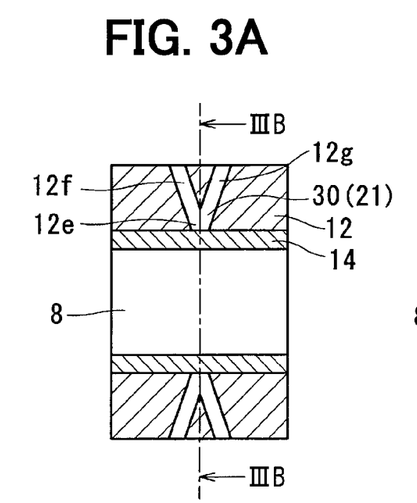
FIG. 3A is a sectional view illustrating a cam shaft bearing part in its radial direction according to the first embodiment.

A method for providing the cooling passage 30 at the outer periphery of the bush 14 will be described in reference to FIGS. 3A and 3B. The cooling passage 30 is provided at least at a position that is opposed radially to a position where the cam 9 is brought into contact with the plunger 10, in a circumferential direction of the bush 14.

Figure 3B:
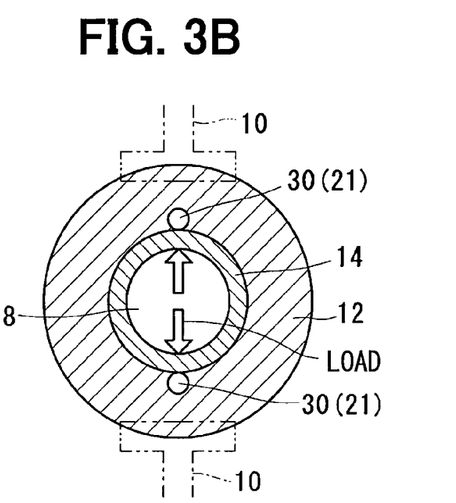
FIG. 3B is a cross-sectional view illustrating the cam shaft bearing part in its axial direction according to the first embodiment.

As indicated by an alternate long and two short dashes line in FIG. 3B, when the plunger 10 is brought into contact with the cam 9 in two (upper and lower) directions, a load is applied downwardly to the cam shaft 8 by the upper plunger 10, and a load is applied upwardly to the cam shaft 8 by the lower plunger 10. Therefore, upper and lower parts of the bush 14 are positions to which the loads are applied the most by the cam shaft 8, and are positions easy to be heated due to sliding between the cam shaft 8 and the bush 14.

Accordingly, positions where the cam 9 is brought into abutment with the plunger 10 and which are opposed radially to the plunger 10 are the positions where the bush 14 is the most easily heated. In the present embodiment, the cooling passages 30 are provided only at these positions in the circumferential direction of the bush 14.

Figure 4A:
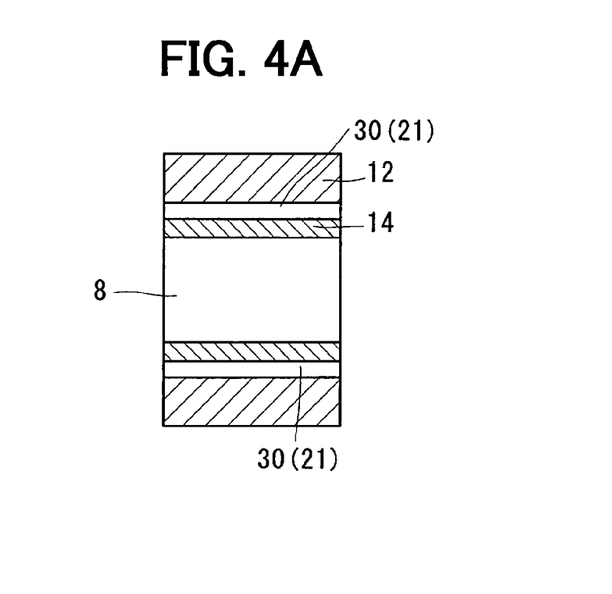
FIG. 4A is a sectional view illustrating the cam shaft bearing part in its radial direction according to the first embodiment.
Figure 4B:
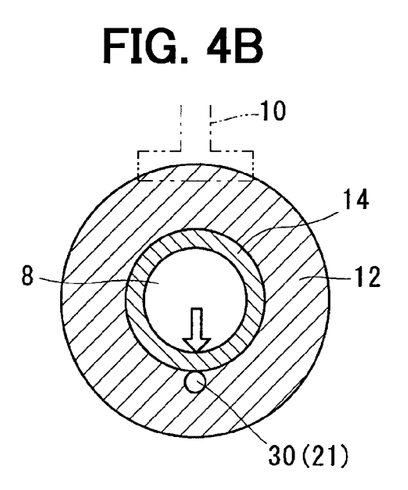
FIG. 4B is a cross-sectional view illustrating the cam shaft bearing part in its axial direction according to the first embodiment.
Figure 4C:
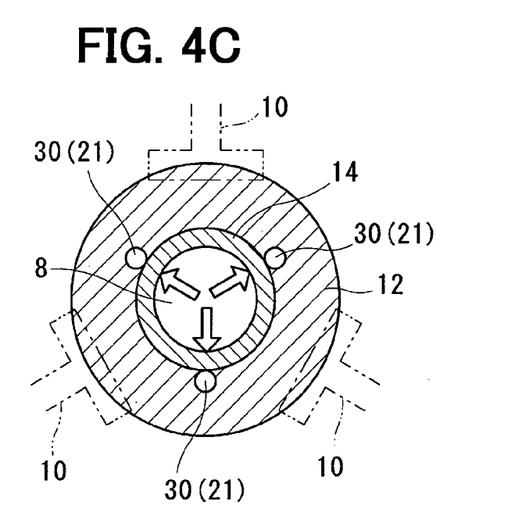
FIG. 4C is a cross-sectional view illustrating the cam shaft bearing part in its axial direction according to the first embodiment.

The cooling passage 30 is provided such that fuel is in contact with an outer peripheral surface of the bush 14. In the present embodiment, the housing main body 12 includes an opening 12*e* which opens toward the outer peripheral surface of the bush 14 close to its center in the axial direction, an inflow passages 12*f* from which fuel flows into the opening 12*e*, and an outflow passage 12*g* to which fuel flows out from the opening 12*e*. The inflow passages 12*f*, the opening 12*e*, and the outflow passage 12*g* are formed to have a V-shape, for example, in radial section. Accordingly, the fuel passing through the opening 12*e* is in direct contact with the bush 14 to cool the bush 14. Alternatively, as illustrated in FIG. 4A, the cooling passage 30 may be provided such that the entire bush 14 in its axial direction is in contact with fuel. More specifically, the cooling passage 30 may be provided between the housing main body 12 and the bush 14 along the entire bush 14 in its axial direction.

When the plunger 10 is brought into abutment with the cam 9 only in one direction (see FIG. 4B), and when the plunger 10 is brought into abutment with the cam 9 in three directions (see FIG. 4C), similar to the case of the abutment in two directions, the cooling passage(s) 30 is (are) provided in the circumferential direction of the bush 14 at least at the position(s) opposed radially to the position(s) where the cam 9 is brought into abutment with the plunger 10.

Effects of the first embodiment will be described below. In the present embodiment, the bush 14 is cooled by disposing the part of the first passage 21 to pass on the outer peripheral side of the bush 14. Therefore, the first passage 21, which is the existing passage, also serves as the cooling passage 30. Accordingly, by passing the fuel discharged from the low-pressure pump 3 on the outer peripheral side of the bush 14 instead of through a clearance (inner peripheral side of the bush 14), the bush 14 is cooled. As a result, the fuel discharged from the low-pressure pump 3 does not leak through the clearance. Thus, the bush 14 can be cooled without affecting the amount of fuel discharged from the low-pressure pump 3.

Second Embodiment

Figure 5A:
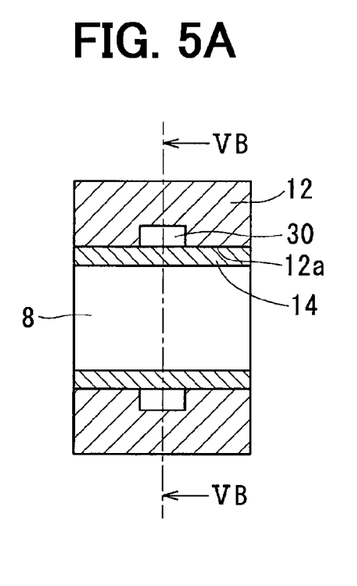
FIG. 5A is a sectional view illustrating a cam shaft bearing part in its radial direction according to a second embodiment.
Figure 5B:
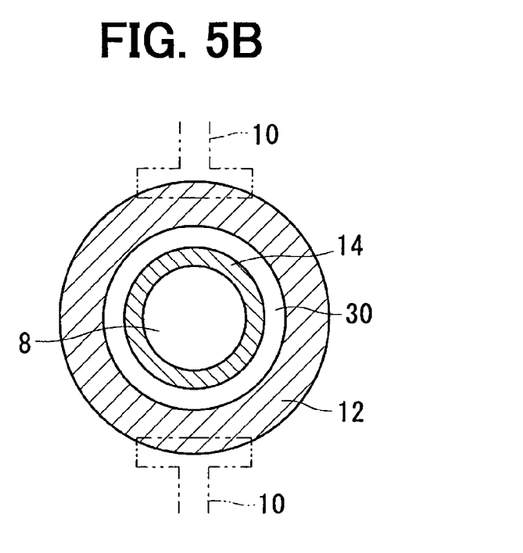
FIG. 5B is a cross-sectional view illustrating the cam shaft bearing part in its axial direction according to the second embodiment.

A second embodiment will be described with reference to FIGS. 5A and 5B with a focus on differences from the first embodiment. The same numerals as the first embodiment indicate their corresponding configurations, and their foregoing explanations are referred to. In the present embodiment, a cooling passage 30 is provided to surround the whole circumference of a bush 14. More specifically, a groove extending along the whole circumference is formed on an inner peripheral surface of a shaft insertion hole 12*a*. This groove serves as the cooling passage 30. In the present embodiment, the groove is formed to be opposed to each other adjacent to the center of the bush 14 in its axial direction.

Third Embodiment

Figure 6A:
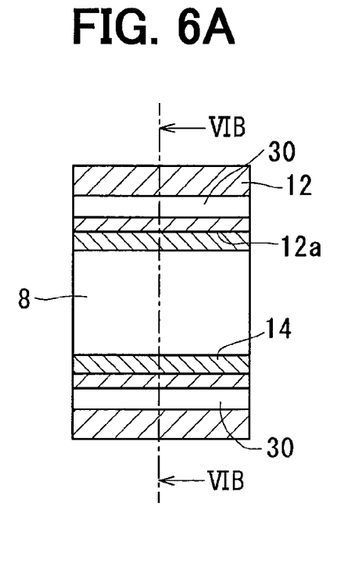
FIG. 6A is a sectional view illustrating a cam shaft bearing part in its radial direction according to a third embodiment.
Figure 6B:
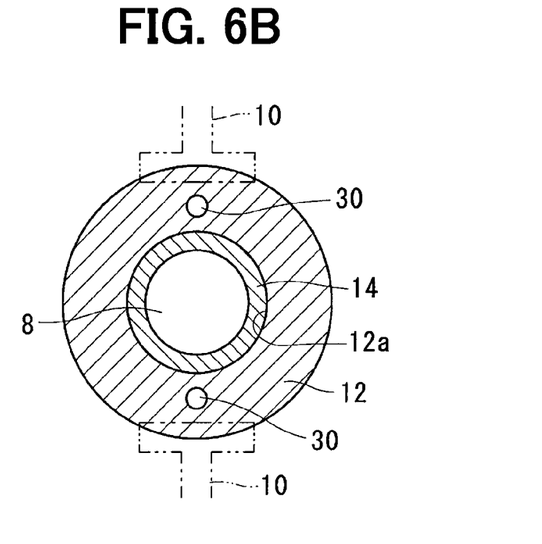
FIG. 6B is a cross-sectional view illustrating the cam shaft bearing part in its axial direction according to the third embodiment.

A third embodiment will be described with reference to FIGS. 6A and 6B with a focus on differences from the first embodiment. The same numerals as the first embodiment indicate their corresponding configurations, and their foregoing explanations are referred to. In the present embodiment, a cooling passage 30 is provided at a position radially outwardly away from an outer peripheral surface of a bush 14. More specifically, a housing main body 12 includes a passage at a position close to the bush 14 radially outward of an inner peripheral surface of a shaft insertion hole 12*a*. This passage serves as the cooling passage 30, and the fuel passing through the cooling passage 30 is not in contact with the outer peripheral surface of the bush 14. In the present embodiment, the cooling passage 30 is provided along the entire bush 14 in its axial direction.

Fourth Embodiment

Figure 7A:
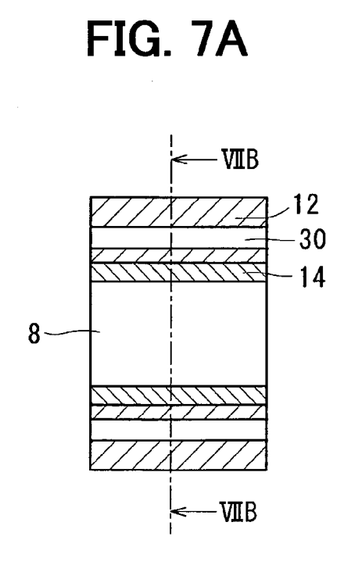
FIG. 7A is a sectional view illustrating a cam shaft bearing part in its radial direction according to a fourth embodiment.
Figure 7B:
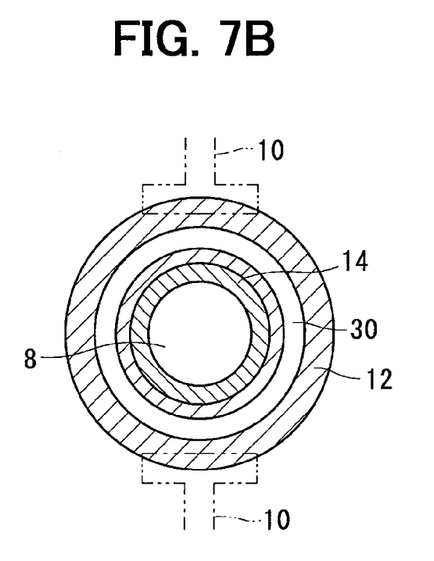
FIG. 7B is a cross-sectional view illustrating the cam shaft bearing part in its axial direction according to the fourth embodiment.

A fourth embodiment will be described with reference to FIGS. 7A and 7B with a focus on differences from the first embodiment. The same numerals as the first embodiment indicate their corresponding configurations, and their foregoing explanations are referred to. In the present embodiment, a cooling passage 30 is provided at a position radially outwardly away from an outer peripheral surface of a bush 14 to surround the whole circumference of the bush 14. More specifically, a passage having a ring shape is formed on the outer peripheral side of the bush 14 in a housing main body 12, and this ring-shaped passage serves as the cooling passage 30. In the present embodiment, the cooling passage 30 is provided along the entire bush 14 in its axial direction.

Fifth Embodiment

Figure 8A:
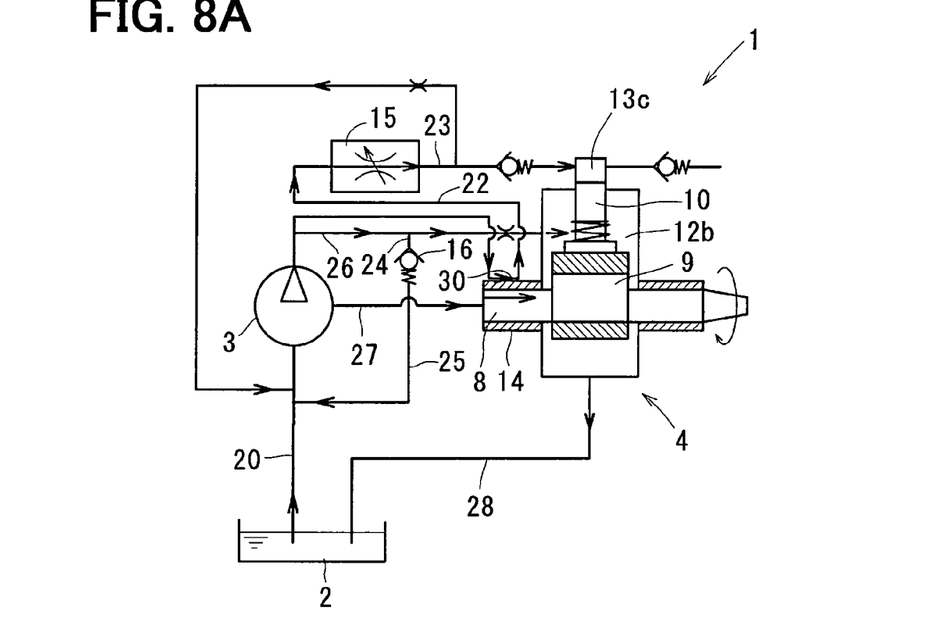
FIG. 8A is a diagram illustrating a fuel supply pump in accordance with a fifth embodiment.

A fifth embodiment will be described with reference to FIG. 8A with a focus on differences from the first embodiment. The same numerals as the first embodiment indicate their corresponding configurations, and their foregoing explanations are referred to. In the present embodiment, a bush 14 is cooled by disposing a part of a second passage 22 to pass on an outer peripheral side of the bush 14. Therefore, the second passage 22, which is the existing passage, also serves as a cooling passage 30. Accordingly, similar operation and effects to the first embodiment can be achieved.

Sixth Embodiment

Figure 8B:
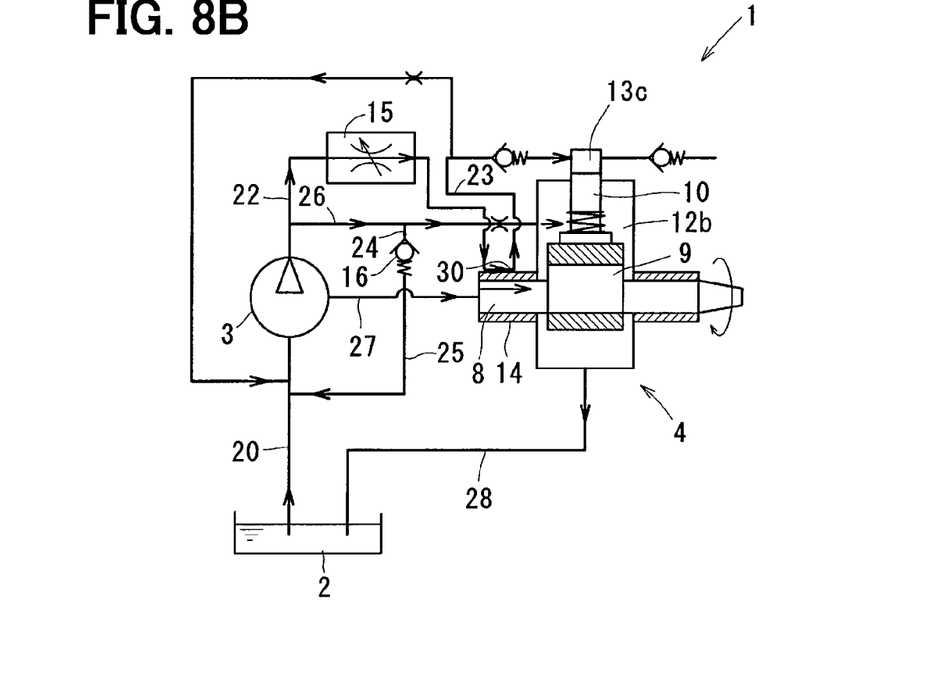
FIG. 8B is a diagram illustrating a fuel supply pump in accordance with a sixth embodiment.

A sixth embodiment will be described with reference to FIG. 8B with a focus on differences from the first embodiment. The same numerals as the first embodiment indicate their corresponding configurations, and their foregoing explanations are referred to. In the present embodiment, a bush 14 is cooled by disposing a part of a third passage 23 to pass on an outer peripheral side of the bush 14. Therefore, the third passage 23, which is the existing passage, also serves as a cooling passage 30. Accordingly, similar operation and effects to the first embodiment can be achieved.

Seventh Embodiment

Figure 9A:
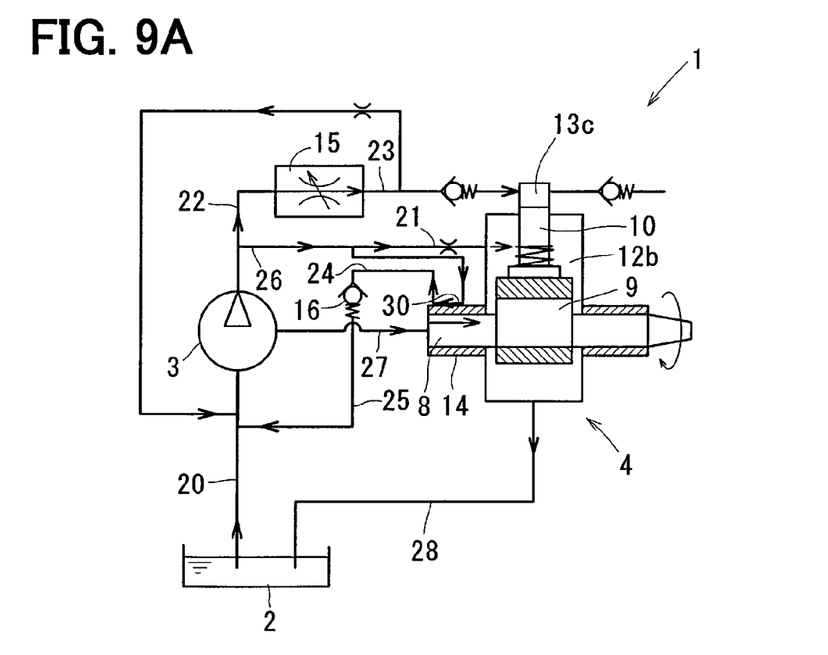
FIG. 9A is a diagram illustrating a fuel supply pump in accordance with a seventh embodiment.

A seventh embodiment will be described with reference to FIG. 9A with a focus on differences from the first embodiment. The same numerals as the first embodiment indicate their corresponding configurations, and their foregoing explanations are referred to. In the present embodiment, a bush 14 is cooled by disposing a part of a fourth passage 24 to pass on an outer peripheral side of the bush 14. Therefore, the fourth passage 24, which is the existing passage, also serves as a cooling passage 30. Accordingly, similar operation and effects to the first embodiment can be achieved.

Eighth Embodiment

Figure 9B:
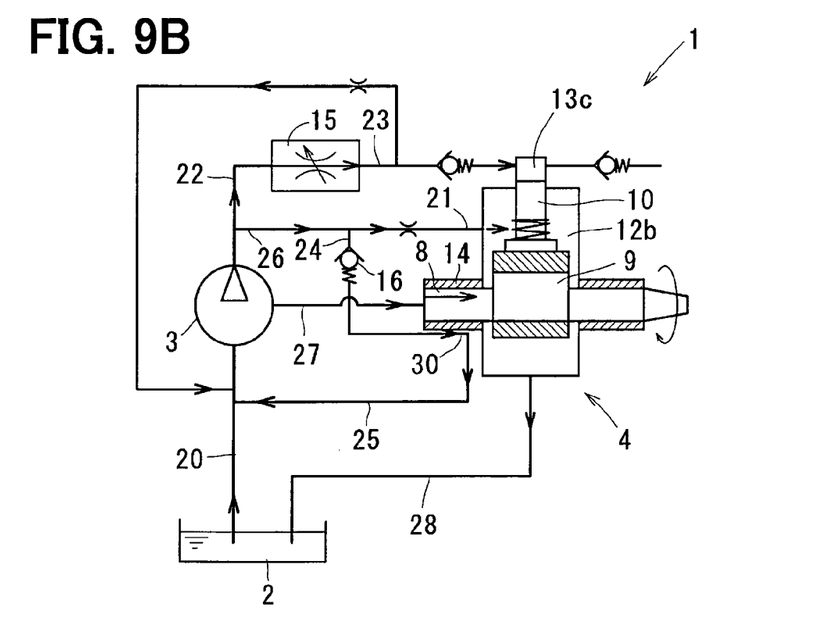
FIG. 9B is a diagram illustrating a fuel supply pump in accordance with an eighth embodiment.

An eighth embodiment will be described with reference to FIG. 9B with a focus on differences from the first embodiment. The same numerals as the first embodiment indicate their corresponding configurations, and their foregoing explanations are referred to. In the present embodiment, a bush 14 is cooled by disposing a part of a fifth passage 25 to pass on an outer peripheral side of the bush 14. Therefore, the fifth passage 25, which is the existing passage, also serves as a cooling passage 30. Accordingly, similar operation and effects to the first embodiment can be achieved.

Ninth Embodiment

Figure 10:
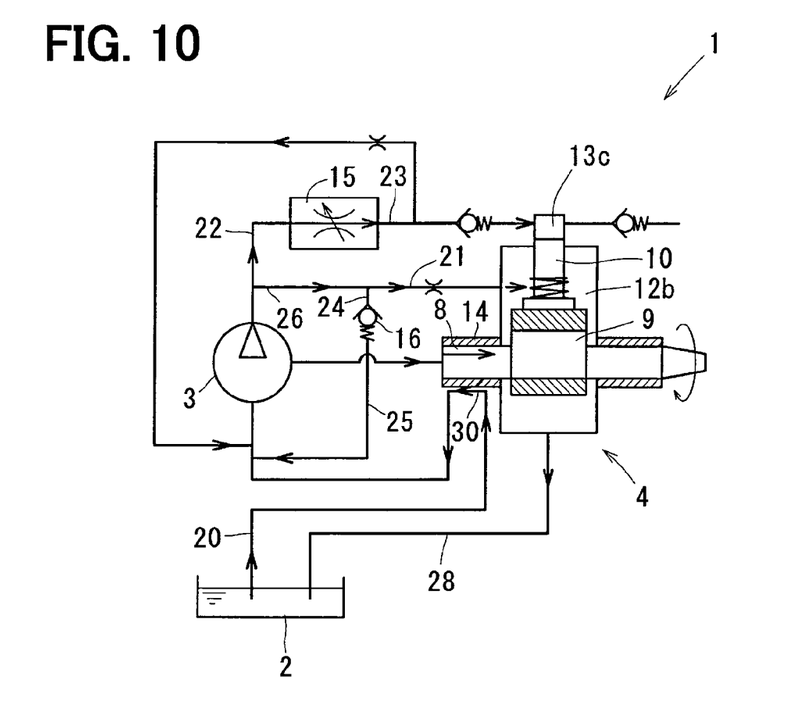
FIG. 10 is a diagram illustrating a fuel supply pump in accordance with a ninth embodiment.

A ninth embodiment will be described with reference to FIG. 10 with a focus on differences from the first embodiment. The same numerals as the first embodiment indicate their corresponding configurations, and their foregoing explanations are referred to. In the present embodiment, a bush 14 is cooled by disposing a part of a fuel suction passage 20 to pass on an outer peripheral side of the bush 14. Therefore, the fuel suction passage 20, which is the existing passage, also serves as a cooling passage 30. Accordingly, similar operation and effects to the first embodiment can be achieved. In addition, the temperature of fuel passing through the fuel suction passage 20 is lower than the temperature of fuel discharged from the low-pressure pump 3. Accordingly, a greater cooling effect than the first embodiment can be produced.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A fuel supply pump comprising:
   a low-pressure pump that is configured to pump up fuel from a fuel tank; and
   a high-pressure pump that includes a pressurizing chamber to which fuel pumped up by the low-pressure pump is supplied and that is configured to pressurize fuel in the pressurizing chamber, wherein:
   the high-pressure pump further includes:
      a cam shaft;
      a cam that is provided eccentrically to a central axis of the cam shaft and is rotated integrally with the cam shaft;
      a plunger that is driven by the cam to pressurize fuel in the pressurizing chamber; a housing that accommodates the cam shaft; and
      a bush that is fixed to the housing to bearing-support the cam shaft; and
   the housing includes a cooling passage, through which fuel discharged from the low-pressure pump flows on an outer peripheral side of the bush to serve as a medium for cooling the bush;
   the fuel supply pump further comprises:
   a metering valve that is configured to regulate a flow rate of fuel supplied from the low-pressure pump into the pressurizing chamber;
   a first passage through which fuel is supplied from the low-pressure pump to the metering valve; and
   a second passage through which fuel is supplied from the metering valve into the pressurizing chamber, wherein a part of the second passage is the cooling passage.

2. The fuel supply pump according to claim 1, further comprising:
   a pressure regulating valve that is configured to regulate pressure of fuel supplied to the metering valve;
   a third passage that connects together an upstream side of the pressure regulating valve and a downstream side of the low-pressure pump; and
   a fourth passage that connects together a downstream side of the pressure regulating valve and an upstream side of the low-pressure pump, wherein a part of the third passage is the cooling passage.

3. A fuel supply pump comprising:
   a low-pressure pump that is configured to pump up fuel from a fuel tank; and a high-pressure pump that includes a pressurizing chamber to which fuel pumped up by the low-pressure pump is supplied and that is configured to pressurize fuel in the pressurizing chamber, wherein:
the high-pressure pump further includes:
  a cam shaft;
  a cam that is provided eccentrically to a central axis of the cam shaft and is rotated integrally with the cam shaft;
  a plunger that is driven by the cam to pressurize fuel in the pressurizing chamber; a housing that accommodates the cam shaft; and
  a bush that is fixed to the housing to bearing-support the cam shaft; and
the housing includes a cooling passage, through which fuel discharged from the low-pressure pump flows on an outer peripheral side of the bush to serve as a medium for cooling the bush;
the fuel supply pump further comprises:
a metering valve that is configured to regulate a flow rate of fuel supplied from the low-pressure pump into the pressurizing chamber;
a pressure regulating valve that is configured to regulate pressure of fuel supplied to the metering valve;
a first passage that connects together an upstream side of the pressure regulating valve and a downstream side of the low-pressure pump; and
a second passage that connects together a downstream side of the pressure regulating valve and an upstream side of the low-pressure pump, wherein a part of the second passage is the cooling passage.

4. The fuel supply pump according to claim 1, wherein the cooling passage is provided at least at a position that is opposed radially to a position where the cam is brought into abutment with the plunger, in a circumferential direction of the bush.

5. The fuel supply pump according to claim 1, wherein the cooling passage is provided to surround a whole circumference of the bush.

6. The fuel supply pump according to claim 1, wherein the cooling passage is provided such that fuel is in contact with an outer peripheral surface of the bush.

7. The fuel supply pump according to claim 1, wherein the cooling passage is provided at a position radially outwardly away from an outer peripheral surface of the bush.

8. The fuel supply pump according to claim 3, wherein the cooling passage is provided at least at a position that is opposed radially to a position where the cam is brought into abutment with the plunger, in a circumferential direction of the bush.

9. The fuel supply pump according to claim 3, wherein the cooling passage is provided to surround a whole circumference of the bush.

10. The fuel supply pump according to claim 3, wherein the cooling passage is provided such that fuel is in contact with an outer peripheral surface of the bush.

11. The fuel supply pump according to claim 3, wherein the cooling passage is provided at a position radially outwardly away from an outer peripheral surface of the bush.

* * * * *